(12) United States Patent
Whittington et al.

(10) Patent No.: US 9,818,507 B1
(45) Date of Patent: Nov. 14, 2017

(54) SHRINK TUBE INSULATION APPARATUS

(71) Applicant: The Florida State University Research Foundation, Inc., Tallahassee, FL (US)

(72) Inventors: Andrew David Whittington, Tallahassee, FL (US); Matthieu Dalban-Canassy, Tallahassee, FL (US); David K. Hilton, Tallahassee, FL (US); Ulf P. Trociewitz, Crawfordville, FL (US); William L. Starch, Crawfordville, FL (US); William R. Sheppard, Tallahassee, FL (US); Alexander Mankin, Tallahassee, FL (US); Joe W. Whittington, Jacksonville, FL (US)

(73) Assignee: The Florida State University Research Foundation, Inc., Tallahasse, FL (US)

( * ) Notice: Subject to any disclaimer, the term of this patent is extended or adjusted under 35 U.S.C. 154(b) by 549 days.

(21) Appl. No.: 14/453,152

(22) Filed: Aug. 6, 2014

Related U.S. Application Data

(60) Provisional application No. 61/885,847, filed on Oct. 2, 2013.

(51) Int. Cl.
*H01B 13/06* (2006.01)
*H02G 1/08* (2006.01)

(52) U.S. Cl.
CPC .......... *H01B 13/062* (2013.01); *H02G 1/083* (2013.01); *Y10T 29/49117* (2015.01)

(58) Field of Classification Search
CPC ...... H02G 1/081; H02G 1/083; H01B 13/062; Y10T 29/49117
USPC .................................................. 254/134.3 FT
See application file for complete search history.

(56) References Cited

U.S. PATENT DOCUMENTS

| 2,655,653 | A | * | 10/1953 | Chauvin | ................. | H02G 1/08 |
| | | | | | | 242/396.4 |
| 3,106,771 | A | * | 10/1963 | Spiro | ................... | H01B 13/062 |
| | | | | | | 254/134.3 FT |
| 3,320,355 | A | | 5/1967 | Booker | | |
| 3,537,167 | A | | 11/1970 | Lawson | | |
| 3,812,568 | A | * | 5/1974 | Nemeth | ................. | H01R 43/20 |
| | | | | | | 156/49 |
| 4,379,102 | A | | 4/1983 | Kertscher | | |
| 4,417,378 | A | * | 11/1983 | Brown | .................... | B29C 63/42 |
| | | | | | | 29/33 M |
| 4,521,363 | A | | 6/1985 | Vogel | | |
| 5,149,056 | A | * | 9/1992 | Jones | ....................... | H02G 1/08 |
| | | | | | | 254/134.3 FT |
| 5,318,630 | A | | 6/1994 | Akin et al. | | |

* cited by examiner

*Primary Examiner* — Livius R Cazan
(74) *Attorney, Agent, or Firm* — Nicholas Pfeifer; Smith & Hopen, P.A.

(57) ABSTRACT

A device and method for sheathing shrink tubing onto materials such as wire, tape, or cables. The device cannot only sheath short lengths of shrink tubing onto material, but also sheath long lengths shrink tubing onto material. Varying embodiments of this device can insulate whole lengths of material with shrink tubing as well as covering certain sections of material for a more precise application.

19 Claims, 4 Drawing Sheets

SHRINK TUBE INSULATION APPARATUS

CROSS-REFERENCE TO RELATED APPLICATIONS

This nonprovisional application claims priority to provisional application No. 61/885,847, entitled "SHRINK TUBE INSULATION APPARATUS," filed Oct. 2, 2013 by the same inventors.

FEDERALLY SPONSORED RESEARCH OR DEVELOPMENT

This invention was made with Government support under Grant Nos. DMR #0654118 and DMR #1157490 awarded by the National Science Foundation. The government has certain rights in the invention.

BACKGROUND OF THE INVENTION

1. Field of the Invention

This invention relates, generally, to sheathing of shrink tubing. More specifically, it relates to an apparatus capable of applying shrink tubing onto long or short lengths of wires, tapes, and cables.

2. Brief Description of the Prior Art

Devices and methods for sheathing shrink tubing are well documented in the art. Most of these devices and methods apply shrink tubing to the ends of wire or cable bundles. The purpose for the application of the shrink tube varies. In some instances, wire identification is required where the application of different colored shrink tubes differentiates between wires in a bundle. Application of certain heat shrink tubes at the end of wire and cable bundles can also prevent dust and liquid from entering into the bundle. These techniques and devices are widely used in industry to provide certain products.

However, these sheathing devices are only purposed for applying relatively short lengths of shrink tube onto a material. Typically, only short lengths, usually anywhere from a few millimeters to a few meters, of shrink tube are desired to be sheathed onto a material. Recently, there has been a need to use shrink tube in such a way that it is sheathed over an entire length of a material. Using shrink tubing as electrical insulation is one example of why a material would be entirely sheathed with shrink tubing. Currently there are no devices for applying large amounts of shrink tubing, not limited to, but in the range of several hundreds of meters, over long lengths of material such as wires, tapes, or cables. Another important consideration is that some materials requiring shrink tube as insulation are fragile and require special care when handling. Accordingly, what is needed is a device that can sheath shrink tube onto the full length of a material without damaging the shrink tube or material. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for safe and efficient sheathing of long or short lengths of wire, tape, or cable with shrink tube over part or the entire length of material is now met by a new, useful, and nonobvious invention.

The novel structure includes a device that can not only sheath short lengths of shrink tubing on to material but also sheath long lengths of material with shrink tubing as well. Varying embodiments of this device can insulate whole lengths of material with shrink tubing as well as covering certain sections of material for a more precise application.

This invention also provides the safety, consistency, and reproducibility of work desired when applying shrink tubing on wire, tape, or cable. Channels in the tracks constrict the movement of the material preventing un-desired twisting, bending, and kinking of the material. Whereas, for example, applying shrink tubing onto material by hand or on a machine that is not suited to handle fragile material puts high risk to both the material and shrink tubing. All embodiments of this device are suited for such fragile material and can sheath such material safely and efficiently.

Certain embodiments may have a guide channel that will hold the shrink tube while material from a spool will be pulled through the shrink tube.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Glossary of Claim Terms

Spool: is a structure capable of rotating about an axis and adapted to hold some amount of material wrapped about the structure in an orientation perpendicular to the rotational axis.

Material: is a flexible member having a length greater than its width.

Tubular Insulation: is any hollow body.

String: is any flexible member having a cross-sectional area small enough to pass through the tubular insulation.

Cross-Sectional Area: is the area of a two-dimensional plane that extends outward in a radial or transverse direction and is created between the outermost surfaces of the object.

Figure 1:
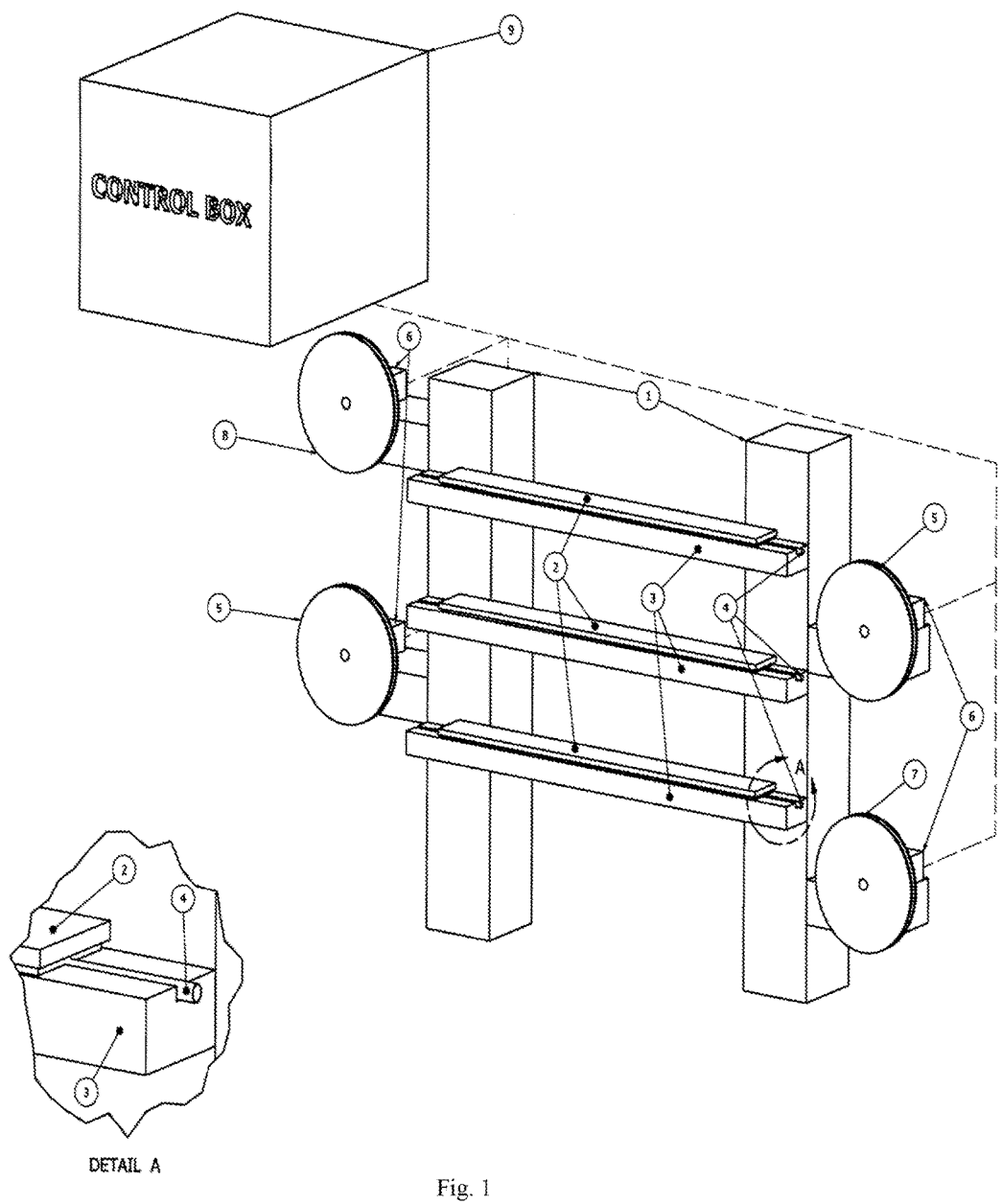
FIG. 1 is a frontal view of one embodiment of this device that is free standing and where all spools and pulleys are driven by motors controlled via a control box.
Figure 2:
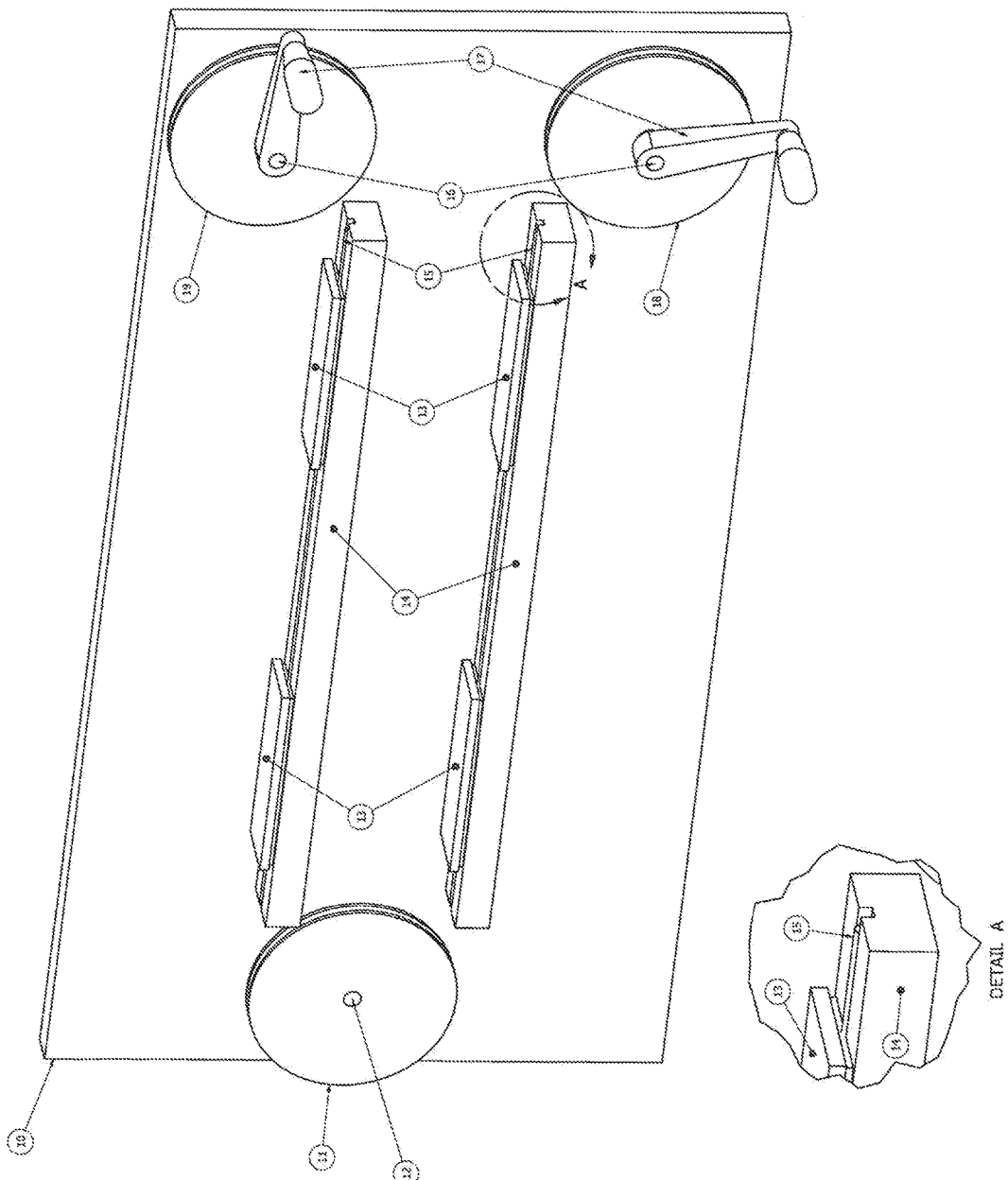
FIG. 2 is another embodiment, which is mounted on a plate, wall, or table driven only by hand power via hand crank.
Figure 3:
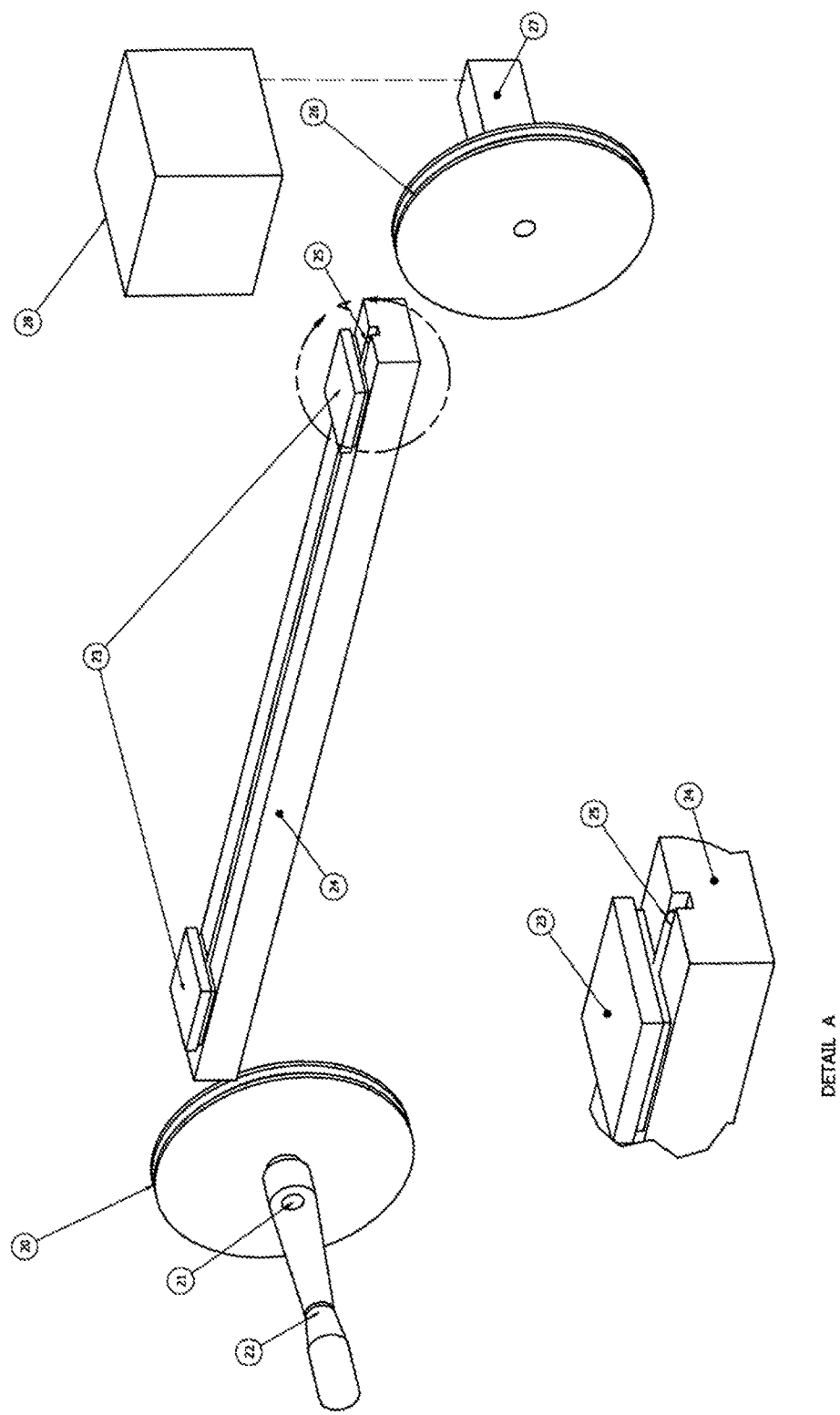
FIG. 3 is a single-track embodiment that could easily be mounted on, for example, a table where the device is hand powered which also has an operational motor.

The invention is a machine, which can insulate short or long lengths of wire, tape, or cable with short or long lengths of shrink tube insulation. FIGS. 1, 2, and 3 show conceptual models of the device and are further discussed below.

For certain applications, this device is the most suitable choice as opposed to other devices. As an example, using this machine to insulate materials, such as (RE=Rare Earth) $REBa_2Cu_3O_{7-x}$ (REBCO) coated conductors, is desired over such devices that use co-extrusion, varnish application, or insulation wrappings. Some superconductors such as $YBa_2Cu_3O_7$- (YBCO) coated conductors are highly sensitive to high temperature, which is usually a requirement for co-extrusion devices. Certain superconductors would not survive such processes because of the high temperature required for co-extrusion. For YBCO, various applications require full coverage insulation. Devices that apply varnishes leave a nonhomogeneous coating thickness on the conductor whereas shrink tubing would be desired here because of the homogenous thickness once applied to the material. This is due to the nature of varnish application. Devices that wrap insulations usually need insulation with an adhesive side that adheres to the material. This in turn increases the thickness of the insulation, which is undesirable for superconductors in certain applications. When the adhesive is removed and the insulation is applied, the wrapping has a tendency to move and separate which cannot happen when using certain superconductor in various applications. This is where shrink tubing and the shrink tube insulation apparatus are desired since the material is thin, continuously covers the material, and can be applied without the need for adhesive or excessively high temperatures.

In FIG. 1, a fully assembled device is shown with two spools (7, 8), two pulleys (5), and three guide channels (3). Tube friction holders (2) are removed from each guide channel to allow for shrink tube (4) placement. Usually, the tube friction holders (2) are comprised of a strip of metal and a strip of rubber with an adhesive backing. The rubber is attached to the metal strip via the adhesive backing. Shrink tubing (4) is placed as needed in the guide channels (3) with the capability to fill the entire length of each of the guide channels (3). Since a full length of material is to be insulated in this example, FIG. 1 shows shrink tubing (4) filling the entire length of track with some extra hanging over the track as well. Placing the shrink tubes (4) in the guide channels aligns the shrink tube (4) with the pulleys (5) and spools (7, 8). Once the shrink tube (4) is placed on the guide channels (3) the tube friction holders (2) are placed back on the guide channels (3) on top of the shrink tube (4). FIG. 1 shows the material spool (7) on the bottom most motor (6) and the empty spool (8) on the top most motor (6). The location of the spools (7, 8) can be switched between the two motors (6) if desired. Starting with the bottom or top guide channel (3), at the end nearest material spool (7) or the empty spool (8), a string, as an example, will be inserted into the end of the shrink tube of the respective guide channel (3). It should be noted that a string is one embodiment of how to accomplish this part of the process. A continuous length of string is then threaded through that tube of insulation. During this process, the tube friction holders (2) keep the insulation stationary while the string is threaded through the shrink tube (4). This allows the string to be pulled through the insulation. Upon reaching the end of that tube and guide channel (3) the string is pulled around the nearest pulley (5) in such a way that guides the string to the next guide channel (3) level threading the insulation of that guide channel (3) as well. This is done for each tube and guide channel until either the empty spool (8) or the material spool (7) is reached. The string is then connected to the empty spool (8) at one end and connected directly to the material on the material spool (7) at the other.

Operating the motors (6) via the control box the material is pulled through the insulation from the material spool (7) while the string is wound up on the empty spool (8). Ample friction applied over the length of the insulation from the tube friction holders (2) will prevent the insulation from moving when pulling the material through the tube. As the material approaches the end of a guide channel (3), a pulley (5) transfers the material to a new guide channel (3). Friction will increase as more material is insulated increasing the tension on the material. To assist the movement of material, the pulleys (5) are motorized and synchronized to help decrease the tension from transferring material from one guide channel (3) to another. This continues until the material reaches the end of the last guide channel (3), at which time the motors (6) are stopped. The shrink tube (4) is then shrunk onto the material, as needed using a heat source. Once the insulation on each level has been shrunk onto the material, the material is wound back on to either spool (7, 8) where the process can be repeated if the desired length of the conductor was not insulated during the first run.

It should be noted that the length and number of levels of guide channels (3) can be increased or decreased as needed. The number of pulleys (5) would scale with how many levels of tracks are desired. In addition, motors (6) are optional in various forms of this device. Apparatuses that insulate lengths of material with sufficiently low friction during material movement can implement hand-powered spools, such as a hand crank mounted onto a spool to move the material. This is shown in FIG. 2 where this device is mounted on a flat surface (10) and is no longer motorized but hand powered. FIG. 2 illustrates one embodiment where the number of guide channels (14) can be varied as well as the number of pulleys (11) if desired. Tube friction holders (13) are shown to also have a varied number as well as length. The process for Insulating material on this version of the device can be identical to FIG. 1 except for the hand-powered movement of the material. In FIG. 1 motors (6) moved the spools (7, 8), in FIG. 2 the hand cranks (17) driven by hand power rotate the spools (18, 19). Motorized pulleys are optional as shown in FIG. 2 where the pulley (11) is free spinning in this version of the device.

FIG. 3 describes yet another possible embodiment of this device. Having the same process as FIG. 1 and FIG. 2 except that this version is hand powered and has a motor (27) driven by a control box (28). One possible use of this version of the device would be to mount the guide channel (24) and the spools (20, 27) to a tabletop. This embodiment could allow for a smaller version of this device, which could be operated by hand while the motor (27) creates tension while moving the material.

A feature of this device is the ability to prevent the insulation from moving while wire, tape, or cable is pulled through. The tube friction holder, which applies some force over the length of shrink tube, was given although it should be noted that this is not the only method in preventing the shrink tube from moving. Other materials and shapes can be used to prevent the tube from moving by placing the material over part or the total length of the shrink tube. Such material can also be placed in the channel to increase the friction as well. Examples of the tube friction holder should not limit the scope of the holders and its various forms.

Figure 4:
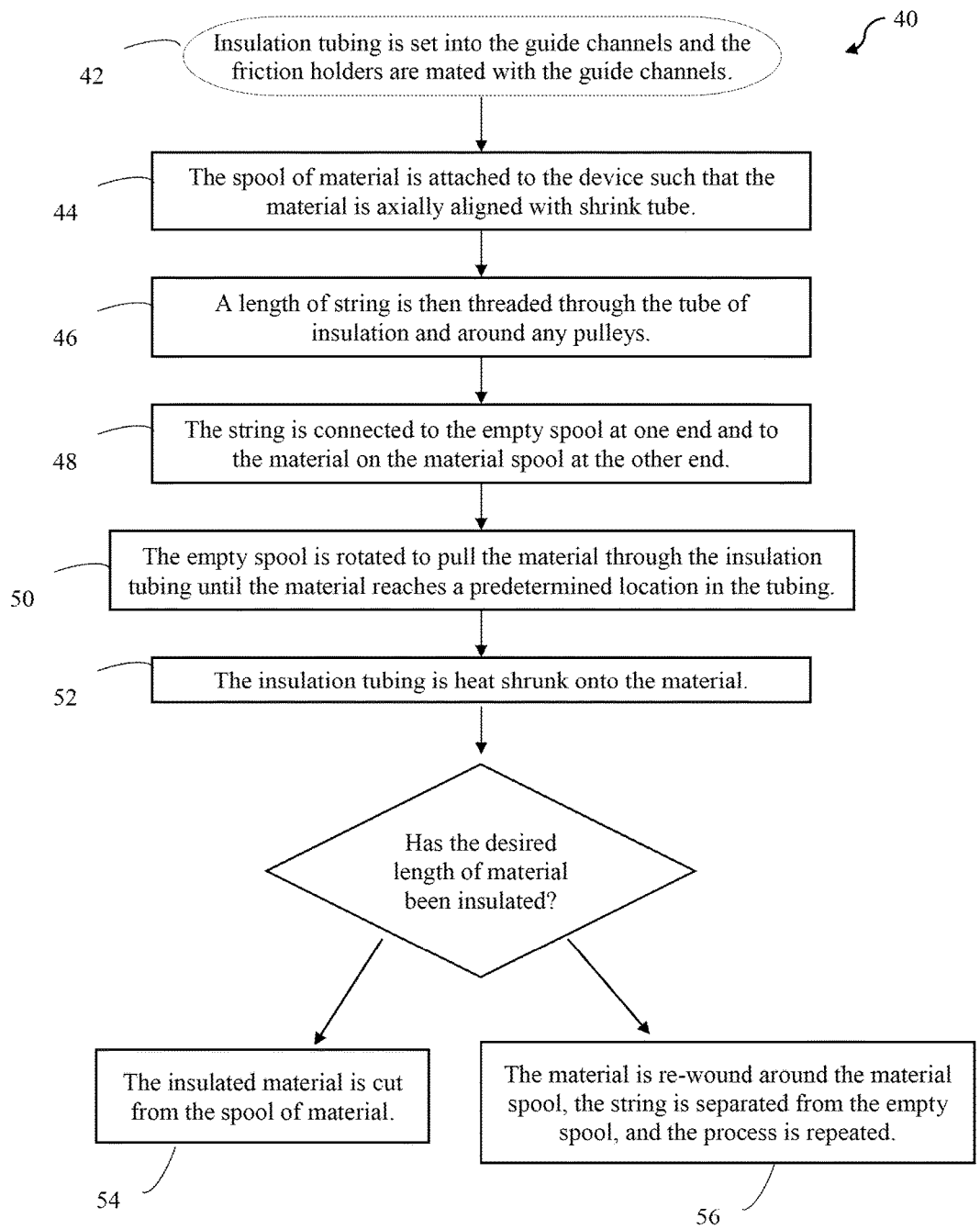
FIG. 4 is a flowchart of a certain embodiment of the present invention.

FIG. 4 provides a certain embodiment of the method, generally denoted by reference numeral 40, for insulating material using the machine described above. Shrink tube (or tube of insulation) of a predetermined length is first set into the guide channels and the friction holders are mated with the guide channels (42). The spool of material is attached to the device such that the material is axially aligned with shrink tube (44). A length of string is then threaded through the tube of insulation and around any pulleys that exist in the particular embodiment of the device (46). During this process, the tube friction holders keep the insulation stationary while the string is threaded through the shrink tube. This is done for each tube and guide channel until either the empty spool or the material spool is reached. The string is then connected to the empty spool at one end and connected directly to the material on the material spool at the other end (48). The empty spool is rotated to pull the string and the material through the insulation tubing until the material has been pulled to a predetermined location with respect to the insulation tubing (50). The insulation tubing is heat shrunk onto the material (52). If the desired length of insulated material has been achieved, the insulated material is cut from the spool of material (54). If the desired length of insulated material is not reached, then the material is re-wound around the material spool, the string is separated from the empty spool, and the process is repeated (56).

In a certain embodiment that has multiple guide channels and pulleys, the length of the guide channels is equivalent to the distance that the material must travel when leaving one guide channel, going around an intermediate pulley, and entering another guide channel. Such an embodiment allows shrink tube insulation to be evenly applied to the material when the material is retracted after a first insulation has been completed and the material has been retracted to the spool of wire.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An apparatus for insulating material, comprising:
 a material spool encircled by material, wherein the material has a predetermined cross-sectional area;
 tubular insulation;
 a guide channel adapted to receive the tubular insulation, wherein the tubular insulation has a cross-sectional area greater than the cross-sectional area of the material;
 a friction holder adapted to mate with the guide channel while in frictional communication with the tubular insulation;
 the guide channel and material oriented such that the material and the tubular insulation are generally aligned about their respective longitudinal axes;
 a string having a first end and a second end along with a cross-sectional area smaller than the cross-sectional area of the tubular insulation; and
 an empty spool adapted to pull material from the material spool through the tubular insulation when the first end of the string is attached to the material, the second end of the string is attached to the empty spool, and the length of the string is threaded through the tubular insulation.

2. The apparatus of claim 1, further comprising two or more guide channels and intermediate pulleys positioned between any sets of two guide channels to allow the string and material to pass around the intermediate pulleys and into tubular insulation placed in each guide channel.

3. The apparatus of claim 1, wherein the empty spool and material spool are controlled by motors.

4. The apparatus of claim 1, wherein the tubular insulation has properties that result in the cross-sectional area of the tubular insulation decreasing when heated to a predetermined temperature such that the cross-sectional area of the tubular insulation is capable of decreasing to a size small enough to become compressively fixed to the material resulting in insulated material.

5. The apparatus of claim 4, wherein the cross-sectional area of the tubular insulation is greater than a cross-sectional area of the insulated material.

6. The apparatus of claim 1, wherein the material is adapted to conduct electricity.

7. A method for insulating material, comprising:
 inserting tubular insulation of a predetermined length into one or more guide channels;
 mating friction holders onto the one or more guide channels such that the friction holders are in frictional communication with the tubular insulation;
 securing a material spool having material wound around a rotational hub, wherein the material spool is adapted to rotate about a rotational axis while secured and the material has a cross-sectional area less than a cross-sectional area of the tubular insulation;

securing an empty spool, wherein the empty spool is adapted to rotate about a rotational axis while secured and is adapted to receive material around a rotational hub;

attaching a string to the rotational hub of the empty spool, such that rotating the empty spool reels in the string around the rotational hub, the string having a first end and a second end along with a cross-sectional area smaller than the cross-sectional area of the tubular insulation;

threading the string through the tubular insulation;

attaching the string to an end of the material;

rotating the empty spool to wrap the string around the hub of the empty spool while pulling the material through the tubular insulation;

stopping the rotation of the empty spool when the material has traveled a predetermined distance through the tubular insulation;

affixing the tubular insulation to the material resulting in insulated material;

if the desired length of insulated material has been achieved, severing the insulated material from the material spool; and if the desired length of insulated material has not been achieved, reeling in the insulated material, by the material spool, detaching the string from the material or the hub of the empty spool, and restarting the process from the step of inserting tubular insulation of a predetermined length into one or more guide channels.

8. The method of claim 7, wherein the step of threading the string through the tubular insulation includes threading the string around one or more intermediate pulleys positioned between any sets of two guide channels.

9. The method of claim 7, further including the step of reeling in the insulated material, by the empty spool.

10. The method of claim 7, wherein the tubular insulation has properties that result in the cross-sectional area of the tubular insulation decreasing when heated to a predetermined temperature.

11. The method of claim 10, wherein the step of affixing the tubular insulation to the material is achieved by heating the tubular insulation to the predetermined temperature to cause the cross-sectional area of the tubular insulation to decrease to a size small enough to become compressively fixed to the material.

12. The method of claim 7, wherein the material spool is secured in a location such that the material is in a generally axial alignment with the tubular insulation.

13. The method of claim 7, wherein the tubular insulation has a cross-sectional area greater than the cross-sectional area of the insulated material.

14. The method of claim 7, wherein the material is adapted to conduct electricity.

15. The method of claim 7, wherein the empty spool is secured in a location such that the material is in a generally axial alignment with the tubular insulation.

16. The method of claim 7, wherein the empty spool and material spool are controlled by motors.

17. An apparatus for insulating material, comprising:

a material spool encircled by material, wherein the material has a predetermined cross-sectional area;

tubular insulation;

two or more guide channels adapted to receive the tubular insulation, wherein the tubular insulation has a cross-sectional area greater than the cross-sectional area of the material and has properties that result in the cross-sectional area of the tubular insulation decreasing when heated to a predetermined temperature such that the cross-sectional area of the tubular insulation is capable of decreasing to a size small enough to become compressively fixed to the material resulting in insulated material;

the tubular insulation having a cross-sectional area greater than the cross-sectional area of the insulated material;

a friction holder adapted to mate with the guide channel while in frictional communication with the tubular insulation;

the guide channel and material oriented such that the material and the tubular insulation are generally aligned about their respective longitudinal axes;

intermediate pulleys positioned between any sets of two guide channels to allow the material to pass around the intermediate pulleys and into tubular insulation placed in each guide channel;

a string having a first end and a second end along with a cross-sectional area smaller than the cross-sectional area of the tubular insulation;

an empty spool adapted to pull material from the material spool through the tubular insulation when the first end of the string is attached to the material, the second end of the string is attached to the empty spool, and the length of the string is threaded through the tubular insulation; and the two or more guide channels having a first guide channel and a last guide channel, wherein the first guide channel and material spool are located in such a position that the material is generally axially aligned with the tubular insulation in the first guide channel and the last guide channel and empty spool are located in such a position that the string, when attached to the empty spool, is generally axially aligned with the tubular insulation in the last guide channel.

18. The apparatus of claim 17, wherein the empty spool and material spool are controlled by motors.

19. The apparatus of claim 17, wherein the material is adapted to conduct electricity.

* * * * *